3,531,517
17,20-DIHYDROXY-A-NORPREGN-
3-EN-2-ONES AND ESTERS
Seymour D. Levine, North Brunswick, and Pacifico A. Principe, South River, N.J., assignors to E. R. Squibb & Sons, Inc., New York, N.Y., a corporation of Delaware
No Drawing. Filed Aug. 1, 1968, Ser. No. 749,349
Int. Cl. C07c 49/44, 69/16, 69/78
U.S. Cl. 260—488                                7 Claims

ABSTRACT OF THE DISCLOSURE

This invention relates to a process for preparing 20α,17α-dihydroxy-A-norprogesterones and derivatives thereof. In accordance with the processes of this invention, a 17α-hydroxyprogesterone is subjected to the action of enzymes of certain microorganisms, whereby the carbonyl group in the 20-position is reduced. The new products of this invention are physiologically active steroids which possess anti-androgenic activity.

---

This invention relates to and has as its objective the provision of new physiologically active steroids. The final products of this invention are of the A-norpregnane series and may be represented by the general formulae

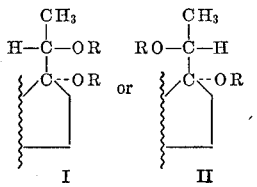

wherein R is either hydrogen or acyl.

The above compounds may be prepared by subjecting the corresponding 17α-hydroxy-A-norprogestogen to the action of enzymes of the microorganism *Streptomyces roseochromogenes*. The use of this microorganism results in the production of a 17α,20α-dihydroxy-A-norprogestogen which is an end product of this invention.

Additionally, this dihydroxy product may be acylated in either the 17α- or 20α-positions by known methods. For example, the 20α-position may be acylated first by reacting the 17α-,20α-dihydroxy compound with an acylating agent in the presence of an organic base such as pyridine. The 17α,20α-diacetyl compound of this invention may be prepared directly by reacting the 17α,20α-dihydroxy compound with an acylating agent in the presence of an acid such as perchloric acid.

The preferred acyl radicals (acylating agents) employed are those of hydrocarbon carboxylic acids of less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic arylcarboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene) pentenoic acid], and the like.

The enzymatic hydroxylation can best be effected either by including the steroid substrate in an aerobic culture of the microorganism, or by bringing together, in an aqueous medium, the steroid, air and the microorganism. In general, the conditions for culturing the microorganisms for the purposes of this invention are (except for the inclusion of the steroid to be converted) the same as those for culturing various other molds for the production of antibiotics and/or riboflavin.

The microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin) a fatty acid, a fat and/or the steroid itself. Preferably, however, the medium includes an assimilable source of carbon and energy in addition to the steroid. The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea). An adequate sterile air supply should be maintained during fermentation, for example, by the conventional methods of exposing a large surface of the medium to air or by utilizing submerged aerated culture.

The steroid may be added to the culture during the incubation period, or included in the medium prior to sterilization or inoculation. The preferred (but not limiting) range of concentration of the steroid in the culture is about 0.01 to 0.10% by weight. The culture period may vary considerably, e.g., within the range of about 6 to 96 hours. The steroid is then recovered from the fermentation medium in the usual manner, as more fully detailed in the examples following.

The final products of this invention are physiologically active substances useful in both human and veterinary medicine. They are highly useful agents in inhibiting or counteracting the effects of androgens (being therefore called anti-androgens) such as testosterone. For example, abatement of skin eruptions in cases of hyperandrogenic acne (the acne condition resulting from the overabundance of an androgen such as testosterone) may be achieved by the peroral administration of the antiandrogens of this invention in dosages of from about 10 to 200 mg./kg. of body weight daily. They may also be administered systemically (e.g., subcutaneously) in a dosage of from about 2 to 60 mg./kg. of body weight daily. Further topical application may be employed in the treatment of this condition, utilizing, for instance, a cream or lotion containing from about 1 to 25% of the final product of this invention.

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of administration of the final products of this invention. For these purposes, they may be administered orally at a dosage of about 10 to 200 mg./kg. of body weight daily, or parenterally at a dosage of about 2 to 60 mg./kg. of body weight daily.

Alternatively, a 17α,20β-dihydroxy-A-norprogesterone may be chemically prepared by reacting the desired 17α-hydroxy-A-norprogesterone with sodium borohydride. This dihydroxy product can then be acylated under conditions previously disclosed to form the 17α-acetoxy or 17α,20β-diacetoxy derivatives of the invention.

The following examples illustrate the invention, all temperatures being in degrees centigrade:

EXAMPLE 1

17α,20α-dihydroxy-A-norpregn-3-en-2-one (A) *Fermentation.*—Surface growth from each of 2-two-week-old agar slants of *Streptomyces roseochromogenes* (ATCC 13,400), the slants containing as a nutrient medium (A):

| | Grams |
|---|---|
| Glucose | 10 |
| Yeast extract | 2.5 |
| $K_2HOP_4$ | 1 |
| Agar | 20 |
| Distilled water to one liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |
| Distilled water to one liter. | |

After seven days incubation at 25° C. with continuous rotary agitation (280 cycles/minute; two-inch stroke), 10% (vol./vol.) transfers are made to thirty-four 250 ml. Erlenmeyer flasks each containing 50 ml. of freshly sterilized medium (B). Steroid (300 micrograms/ml.) is then added by supplementing each flask with 0.25 ml. of a sterile solution (60 mg./ml.) of 17α-hydroxy-A-norprogesterone in N,N-dimethylformamide. A total of 510 mg. is fermented.

After approximately 48 hours of further incubation using identical conditions as described above, the contents of the flasks are pooled and the broth is adjusted to pH 4.5 with 12 N $H_2SO_4$. The acidified broth is then filtered through a Seitz clarifying pad. The flasks, mycelium and pad are washed with successive 100 ml. portions of warm water. The combined filtrate and washings have a volume of 2200 ml.

(B) The thus obtained filtrate is extracted with chloroform three times. The chloroform extracts are washed with water three times, dried over sodium sulfate and evaporated to dryness. The residue is crystallized from ethyl acetateisopropyl ether to give 227 mg. of 17α,20α-dihydroxy-A-norpregn-3-en-20-one, M.P. 195–196.5°. The analytical sample is prepared by recrystallization from ethyl acetate-isopropyl ether, M.P. 196.5–197.5°; $\lambda^{KBr}$ 2.81, 2.94, 5.96 and 6.18μ; $\lambda^{EtOH}$234μ (ε=15,900), $\tau^{CDCl_3}_{TMS}$ 9.22 (s., 18–Me), 8.82 (s., 19–Me), 8.81 (d., 21–Me, J=6 c./s.), 6.13 (m., 20α–H) and 4.24 (s., 3–H).

*Analysis.*—Calc'd for (percent): C, 75.43; H, 9.50. Found (percent): C, 75.63; H, 9.70.

EXAMPLE 2

17α-hydroxy-20α-acetoxy-A-norpregn-3-en-2-one

A solution of 40 g. of 17α,20α-dihydroxy-A-norpregn-3-en-2-one in 0.2 ml. of acetic anhydride and 0.4 ml. of pyridine is left at room temperature for 4 hours, diluted with water and the precipitate collected by filtration to give 41 mg. of 17α-hydroxy-20α-acetoxy-A-norpregn-3-en-2-one, M.P. 235–237°. The analytical sample is prepared by recrystallization from acetone-ether to afford the analytical sample, M.P. 236.5–237.5°; $\lambda^{KBr}$ 2.91, 5.76, 5.96 and 6.18μ; $\lambda^{EtOH}$234 mμ (ε=16,500);

$\tau^{CDCl_3}_{TMS}$ 9.17 (s., 18–Me), 8.82 (s., 19–Me), 8.77 (d., 21–Me, J=6 c./s.), 7.94 (s., 20β–CH$_3$C(=O)–), 4.9 (m., 20α–H) and 4.25 (s., 3–H).

*Analysis.*—Calc'd for (percent): C, 73.30; H, 8.95. Found (percent): C, 73.23; H, 8.82.

EXAMPLE 3

17α,20α-diacetoxy-A-norpregn-3-en-2-one

A solution of 0.0033 ml. of perchloric acid in 0.3 ml. of acetic anhydride is added to 500 mg. of 17α,20α-dihydroxy-A-norpregn - 3 - en - 2 - one or 17α-hydroxy-20α-acetoxy-A-norpregn-3-en-2-one in 10 ml. of acetic anhydride. The reaction mixture is stirred at room temperature for 0.5 hour, and then poured into ice-water and extracted with chloroform. The chloroform extracts are washed with 8% salt solution, dried and evaporated to dryness to give 17α,20α-diacetoxy-A-norpregn-3-en-2-one.

EXAMPLE 4

17α,20β-dihydroxy-A-norpregn-3-en-2-one

A solution of 1.4 g. of 17α-hydroxy-A-norprogesterone in 225 ml. of methanol is treated with 280 mg. of sodium borohydride and stirred at zero degrees for one hour. Acetic acid is added and the mixture evaporated and the residue treated with water and extracted with chloroform. The chloroform extracts are washed with 8% salt solution, dried and evaporated. The residue is crystallized from chloroform-isopropyl ether to give 1.1 g. of 17α,20β-dihydroxy-A-norpregn-3-en-2-one, M.P. 208–209°. The analytical sample is prepared by recrystallization from chloroform-isopropyl ether, M.P. 211–212°; $\lambda^{KBr}$ 2.81, 2,87, 5.95 and 6.19μ; $\lambda^{EtOH}$ 233 mμ (ε=15,000);

$\tau^{TMS}_{CDCl_3}$ 9.14 (s., 18–Me), 8.83 (s., 19–Me), 8.83 (d., J=6 c./s., 21–Me), 5.98 (q., J=6 c./s., 20α–H) and 4.27 (s., 3–H)

*Analysis.*—Calc'd for (percent): C, 75.43; H, 9.50. Found (percent): C, 75.44; H, 9.51.

EXAMPLE 5

17α-hydroxy-20β-acetoxy-A-norpregn-3-en-2-one

A solution of 50 mg. of 17α,20β - dihydroxy-A-norpregn-3-en-2-one in 0.25 ml. of acetic anhydride and 0.50 ml. of pyridine is left at room temperature for 4 hours. The reaction mixture is diluted with water and the precipitate collected by filtration to give 35 mg. of 17α-hydroxy - 20β-acetoxy-A-norpregn-3-en-2-one, M.P. 205–207°. The analytical sample is prepared by recrystallization from chloroform-isopropyl ether, M.P. 211–212°; $\lambda^{KBr}$ 2.80, 5.80, 5.95 and 6.19μ; $\lambda^{EtOH}$ 232 mμ (ε=15,000);

$\tau^{TMS}_{CDCl_3}$ 9.23 (s., 18–Me), 8.81 (s., 19–Me), 8.77 (d., J=6 c./s., 21–Me), 7.94 (s., 20β—CH$_3$—C(=O)—O), 4.89 (s., 20α–H) and 4.27 (s., 3–H)

*Analysis.*—Calc'd for (percent): C, 73.30; H, 8.95. Found (percent): C, 73.23; H, 8.82.

EXAMPLE 6

17α,20β-diacetoxy-A-norpregn-3-en-2-one

Following the procedure in Example 3, but substituting the corresponding 20β-compounds, there is obtained the title compound.

The invention may be variously otherwise embodied within the scope of the appended claims.

What is claimed is:
1. A compound having the formulae

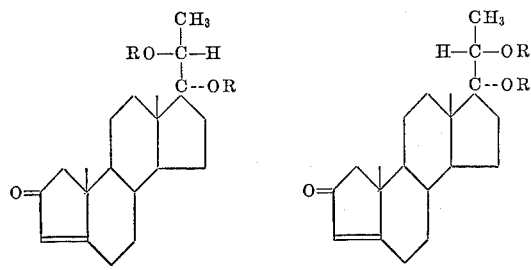

wherein R is hydrogen or acyl of a hydrocarbon carboxylic acid of less than twelve carbon atoms.

2. A compound in accordance with claim 1 having the name 17α,20α-dihydroxy-A-norpregn-3-en-2-one.

3. A compound in accordance with claim 1 having the name 17α-hydroxy-20α-acetoxy-A-norpregn-3-en-2-one.

4. A compound in accordance with claim 1 having the name 17α,20α-diacetoxy-A-norpregn-3-en-2-one.

5. A compound in accordance with claim 1 having the name 17α,20β-dihydroxy-A-norpregn-3-en-2-one.

6. A compound in accordance with claim 1 having the name 17α-hydroxy-20β-acetoxy-A-norpregn-3-en-2-one.

7. A compound in accordance with claim 1 having the name 17α,20β-diacetoxy-A-norpregn-3-en-2-one.

References Cited

Chem. Abstracts: 53:22081C, 57:13838h, 62:10492a, 66:64377v.

LORRAINE A. WEINBERGER, Primary Examiner

V. GARNER, Assistant Examiner

195—51; 260—586, 468, 476, 486; 424—311, 331, 308, 314